(12) United States Patent
DeCenzo et al.

(10) Patent No.: US 7,472,423 B2
(45) Date of Patent: Dec. 30, 2008

(54) METHOD AND APPARATUS FOR ANONYMOUSLY TRACKING TV AND INTERNET USAGE

(75) Inventors: Christopher J DeCenzo, San Francisco, CA (US); Sihai Xiao, Freemont, CA (US)

(73) Assignee: TVWorks, LLC, Philadelphia, PA (US)

( * ) Notice: Subject to any disclaimer, the term of this patent is extended or adjusted under 35 U.S.C. 154(b) by 954 days.

(21) Appl. No.: 10/107,599

(22) Filed: Mar. 27, 2002

(65) Prior Publication Data
US 2003/0188171 A1  Oct. 2, 2003

(51) Int. Cl.
*G06F 7/04* (2006.01)
*H04L 9/00* (2006.01)

(52) U.S. Cl. .............................. 726/26; 713/175; 726/2
(58) Field of Classification Search .................. 726/26, 726/2; 725/2, 110, 100, 131, 139, 151; 713/185, 713/193, 175
See application file for complete search history.

(56) References Cited

U.S. PATENT DOCUMENTS

| | | | | |
|---|---|---|---|---|
| 5,604,803 | A * | 2/1997 | Aziz | 713/155 |
| 5,923,842 | A * | 7/1999 | Pedersen et al. | 726/8 |
| 6,023,510 | A * | 2/2000 | Epstein | 705/74 |
| 6,067,621 | A * | 5/2000 | Yu et al. | 713/172 |
| 6,253,203 | B1 * | 6/2001 | O'Flaherty et al. | 707/9 |
| 6,397,224 | B1 * | 5/2002 | Zubeldia et al. | 707/102 |
| 6,480,850 | B1 * | 11/2002 | Veldhuisen | 707/9 |
| 6,807,569 | B1 * | 10/2004 | Bhimani et al. | 709/217 |
| 6,938,022 | B1 * | 8/2005 | Singhal | 705/74 |
| 7,003,789 | B1 * | 2/2006 | Linehan | 725/1 |
| 2001/0011247 | A1 * | 8/2001 | O'Flaherty et al. | 705/39 |
| 2001/0029496 | A1 * | 10/2001 | Otto et al. | 705/74 |
| 2001/0049620 | A1 * | 12/2001 | Blasko | 705/10 |
| 2001/0054155 | A1 * | 12/2001 | Hagan et al. | 713/193 |
| 2002/0010684 | A1 * | 1/2002 | Moskowitz | 705/75 |
| 2002/0019764 | A1 * | 2/2002 | Mascarenhas | 705/10 |
| 2002/0053035 | A1 * | 5/2002 | Schutzer | 713/202 |
| 2002/0174363 | A1 * | 11/2002 | Chefalas et al. | 713/201 |
| 2003/0028883 | A1 * | 2/2003 | Billmaier et al. | 725/46 |
| 2003/0033534 | A1 * | 2/2003 | Rand et al. | 713/185 |
| 2003/0067554 | A1 * | 4/2003 | Klarfeld et al. | 348/461 |

\* cited by examiner

*Primary Examiner*—Emmanuel L Moise
*Assistant Examiner*—Techane J Gergiso
(74) *Attorney, Agent, or Firm*—Saul Ewing LLP; Stephen J. Driscoll (57) ABSTRACT

A system provides for tracking the behavior of television viewers and Internet browsers while protecting the privacy of the user. The level of privacy is under control of the user. In one embodiment, an arbitrary anonymous identifier is assigned to the user. The selection of a new arbitrary anonymous identifier is under the control of the user. In a second embodiment, a private anonymous identifier is based on a user entered password. The user history data is stored on a history server using the private anonymous identifier. An authentication server is provided to validate the private anonymous identifier before transferring the user history data to the history server.

12 Claims, 5 Drawing Sheets

METHOD AND APPARATUS FOR ANONYMOUSLY TRACKING TV AND INTERNET USAGE

FIELD OF THE INVENTION

The present invention relates to the field of privacy. In particular, the present invention relates to providing privacy for a user while tracking the user's behavior, such as while viewing TV, browsing the Internet, playing video games or using other applications.

BACKGROUND OF THE INVENTION

It is considered desirable to record the viewing behavior (also termed viewing habits) of television viewers and/or the browsing habits (i.e., browsing behavior) of Internet users. The viewer history data collected is used for a variety of purposes.

For example, the size of an audience for a given television show is of interest to advertisers and broadcasters. Typically, the size of the audience is measured by recording the television channels watched by a statistical sample of television viewers. The statistical sample is then extrapolated to the whole to determine the size of the audience for each television show.

As another example, the viewing habits of individual television viewers are also useful to cable and satellite broadcasters for the purpose of delivering targeted advertising. Digital television systems provide the ability to deliver different advertisements to different viewers during the same time slot on the television show. In order to select advertisements of interest to each particular viewer, the past viewing habits of each subscriber is recorded in a viewing history. Advertisements are selected for each individual viewer based on a profile derived from the viewing history of each individual viewer.

Similarly, browsing habits of Internet users is useful for various purposes. Advertisers use a profile of individual browsing habits to select targeted advertisements tailored to the interests of the individual Internet user. More specifically, if an Internet user at a search site such as YAHOO performs a keyword search that includes automobiles, then future advertisements for that particular Internet user may be selected so as to relate to automobiles. As a further example, a video games service over the Internet or cable, may record the playing habits of subscribers. Game playing statistics can be used to eliminate less popular games and emphasize popular games. Game playing statistics can also be used to account for royalties to authors.

However, tracking and recording the viewing and browsing habits has raised privacy concerns. The knowledge gained by recording viewing habits is regarded by some as an invasion of privacy and has the potential for misuse. It would be desirable to obtain the benefits of tracking the viewing habits of individuals while preserving the individuals' right of privacy.

In one approach to privacy, each viewer (or settop box) is assigned a unique but arbitrary anonymous identification number. The viewer characteristics and individual viewing history are associated with the arbitrary anonymous identification number. The individual viewer's identity (or settop box) is not disclosed. However, it is often possible to discover the specific individual viewer's identity (or settop box) associated with the arbitrary anonymous identification number, thereby destroying the viewer's privacy.

SUMMARY OF THE INVENTION

Privacy Control by the Viewer

The present invention provides a selectable level of privacy that permits the viewer to control the level of privacy. The viewer selects one of three privacy levels: "blocked", "arbitrary anonymous" or "private anonymous". At the highest level of privacy, the blocked level of privacy prevents any identity from being associated with the data collected or stored.

A blocked level of privacy provides good privacy for the viewer. However, it is impossible to group the event history data indexed by user's identity since all event data is associated with the same ID "blocked". Thus, it is desirable to have a mechanism that allows the cable operator to determine which viewer took what actions, yet without exposing the identity of the viewer. The ability to differentiate between viewers permits the system operator to determine the number of unique users performing a given action, and also allows the system operator to track the course of actions by a specific user.

Arbitrary Anonymous

If the user selects the "arbitrary anonymous" level of privacy, the system assigns an arbitrary anonymous identifier to be associated with the user. The random identity (an arbitrary anonymous identifier) for each user is unique. The service provider (such as a CATV operator, or ISP) maintains the correspondence between the arbitrary anonymous identifier and the user in secrecy.

In operation, the arbitrary anonymous identifier associated with each user is stored on a user identity server/database, referred to herein as a Datapoint server (which is typically co-located with the service provider). By selecting the "arbitrary anonymous" level of privacy, the user consents to submit his behavior data anonymously to a user history data server/database (referred to herein as an Imprint server). The user's behavior data stored on the Imprint server is associated with the user's arbitrary anonymous identifier and not with the user's actual identity. No user or device (settop) specific information attached to the user's behavior data that can be mapped back to the user's account information. Thus, the user's behavior data on the Imprint server is anonymous data.

The Imprint server collects various events performed by the settop box users. Such events include changing the channel, loading a web page, muting the volume, and the like. The user events are coupled (tagged) with the time at which such events happened. The settop box sends the viewer events (essentially as a history of viewer actions) to the Imprint server which loads them into a database for future data mining and analysis. Since it is useful to analyze viewer events on a per user basis, each element of the user behavior data is saved with the arbitrary anonymous identifier unique to the user.

In operation, the arbitrary anonymous identifier is stored on the settop (at the viewer's location). The arbitrary anonymous identifier is also stored on the Datapoint server by the service provider. The settop attaches arbitrary anonymous identifier to the user's behavior data as the settop periodically uploads behavior (stored history of previous viewer actions) data to the Imprint server. Generally, in contrast to the Datapoint server, which is typically located at the same location as the service provider, the Imprint server is typically not co-located with the service provider.

The present system provides the user with the ability to change to a new arbitrary anonymous identifier. If the user believes his or her privacy has been compromised or if the user is not satisfied with his or her profile (e.g., advertisements seem inappropriate or misdirected), the user may select a new identity that is unconnected to the former identity.

In response to a request by the user for a new identity, the Datapoint server (under the control of the service provider) assigns a new arbitrary anonymous identifier to correspond to the user's future behavior data. The former arbitrary anonymous identifier is erased by overwriting it with the new arbitrary anonymous identifier. Thereafter, the behavior data in the viewer's history file will be associated only with the new arbitrary anonymous identifier. The user is "delinked" from a former arbitrary anonymous identifier and begins a new identity with a new arbitrary anonymous identifier.

Private Anonymous

The present invention is embodied in a method and apparatus in which the user generates a private anonymous identifier wherein the system operator has no knowledge of the correspondence between the user and the private anonymous identifier.

In particular, the present invention is embodied in a repeatable way to dynamically generate the same unique private anonymous identifier for a user, where the unique private anonymous identifier itself cannot easily be reverse mapped back to the originating user. In order to be not easily reverse mapped, the forward mapping is at least as secure as encryption. Since the private anonymous identifier cannot be easily reversed mapped back to the individual viewer, the viewer's privacy is preserved.

More specifically, the user generates a private anonymous identifier from a user-selected password and the unit identifier (unit ID or UID) of the settop box. The UID may be associated with the settop hardware, either hardwired into the settop or supplied by software downloads. Alternatively, the UID may be associated with the user and supplied by software downloads. The private anonymous identifier is a random set of characters and/or numbers derived from such user-selected password. The settop device stores the private anonymous identifier and attaches it to the user's behavior data as it is periodically uploaded to the Imprint server. The private anonymous identifier is also stored on the Imprint server along with the user's behavior data. Neither the settop box nor the Datapoint server or the service provider stores the user-selected password.

At the Imprint server, the viewer's history data is associated with only the private anonymous identifier. There is no user (personal identity) or device specific information (such as the unit ID of the settop) attached to his or her behavior data in the viewer's history data that can be mapped back to the user's account information. Thus the viewer's history data on the Imprint server is both anonymous and private.

The private anonymous identifier is based on a password selected by the user, and this password is not stored by the service provider. A third party has no basis to determine which specific user sent behavior data corresponding to a given private anonymous identifier.

The private anonymous identifier concept also allows the user to instantly erase (delink) himself from his prior viewing history. If the user decides to change his or her private anonymous identifier (by selecting new password) the old private anonymous identifier is overwritten with a new private anonymous identifier, effectively delinking the user from his previous behavior history. The service provider does not generate the new private anonymous identifier. The new private anonymous identifier is generated at the settop box. Furthermore, the service provider is unable to link up the viewing history associated with the old private anonymous identifier with the viewing history associated with the new private anonymous identifier.

Password Security

The present invention further includes features to avoid storing the user selected password either on the settop by the user, or at the headend, by the service provider.

That is, for security reasons, the users' password is not stored in the settop box. (Additionally, the settop typically has limited persistent storage available). The lack of a stored password presents a problem in that there is no way to directly compare the presently entered password to a previously entered password.

In accordance with another aspect of the present invention, a system method and apparatus is provided for the purpose of checking that a reentered password at the settop box is the same as the previously established password.

First, the private anonymous identifier and the entered password are used to generate a private anonymous identifier check using a one way hash function like MD5. The private anonymous identifier check is stored in the settop box and in the Datapoint server at the service provider. Thereafter, whenever the user reenters his password, the private anonymous identifier check is regenerated and compared with the stored private anonymous identifier check. If the regenerated private anonymous identifier check is equal to the stored private anonymous identifier check, then the reentered password is valid. If the regenerated private anonymous identifier check is not equal to the stored private anonymous identifier check, then an error message, "incorrect password" is displayed to the user.

The private anonymous identifier check is generated and stored in the settop box during initial registration. Typically, since the settop box has limited persistent storage, the service provider will restore the private anonymous identifier check to the settop box upon occurrence of a power up cycle.

Verification of Private Anonymous Event

The present invention further includes features to prevent hackers from spoofing the system by generating random private anonymous identifiers accompanied by the false viewer behavior data. In accordance with the latter aspect of the present invention, a system method and apparatus in an authentication server is provided for the purpose of determining that a given private anonymous identifier is valid.

As indicated above, the private anonymous identifier is generated at the client device itself (the settop box). The true anonymity of the private anonymous identifier that solves one problem also presents another problem. The Imprint server merely receives a number (the private anonymous identifier) and has no way of determining that the received private anonymous identifier is from a valid user. A rogue cracker could attempt to simulate countless users with different phony private anonymous identifiers.

In accordance with the present invention, a method and apparatus is provided to verify that a given private anonymous identifier is valid, but without compromising privacy. More specifically, before being sent to the Imprint server, the private anonymous identifier and the corresponding viewer history data is sent to a verification server at a separate network node. The verification server verifies whether such given private anonymous identifier is valid (i.e. corresponds to a valid subscriber). If such given private anonymous identifier is determined to be valid, the verification server forwards the validated private anonymous identifier along with the corresponding viewer history data to the Imprint server. If such given private anonymous identifier is determined not to be valid, the verification server does not forward either the private anonymous identifier or the corresponding viewer history data to the Imprint server.

The present invention includes two alternative embodiments of a method and apparatus including an authentication server in which a given private anonymous identifier is determined to be valid.

In a first embodiment of the invention using a private anonymous identifier, the authentication server receives a private anonymous identifier and password from the viewer. Using the data received from the viewer, the authentication server computes the private anonymous identifier check. The authentication server then forwards the computed private anonymous identifier check to the service provider and Datapoint server. The authentication service request is essentially: "Is this private anonymous identifier check valid?" The Datapoint server searches its database of a valid users and responds to the authentication server by indicating whether the private anonymous identifier check sent by the authentication server is either valid or not valid. If the private anonymous identifier is valid, then the authentication server forwards the viewer history data to the Imprint server. If the private anonymous identifier is not valid, then the authentication server does not forward the viewer history data to the Imprint server.

In a second embodiment of the invention using a private anonymous identifier, the authentication server receives a private anonymous identifier and password from the viewer. As before, the authentication server communicates with the service provider and Datapoint server, which determines whether the private anonymous identifier is valid. In addition, the authentication server provides a validation ticket based on the private anonymous identifier of each individual viewer.

Thereafter, when the authentication server receives a private anonymous identifier along with viewer history data and the validation ticket, the authentication server can validate the private anonymous identifier by checking the validation ticket. In such manner, it is not necessary for the authentication server to communicate with the service provider and data point server each time a given private anonymous identifier is encountered. Instead, the authentication server checks the validation ticket received from the viewer. The authentication server thereafter acts as a gateway between the settop box and the Imprint server.

Viewer Choices

The viewer can always maintain the highest level of privacy by choosing the "blocked" privacy level. However, the service provider may provide viewer incentives such as discounts, coupons or even the possibility of eliminating less relevant advertising, if the viewer to would select either the arbitrary anonymous or private anonymous level of privacy.

DETAILED DESCRIPTION

Figure 1:
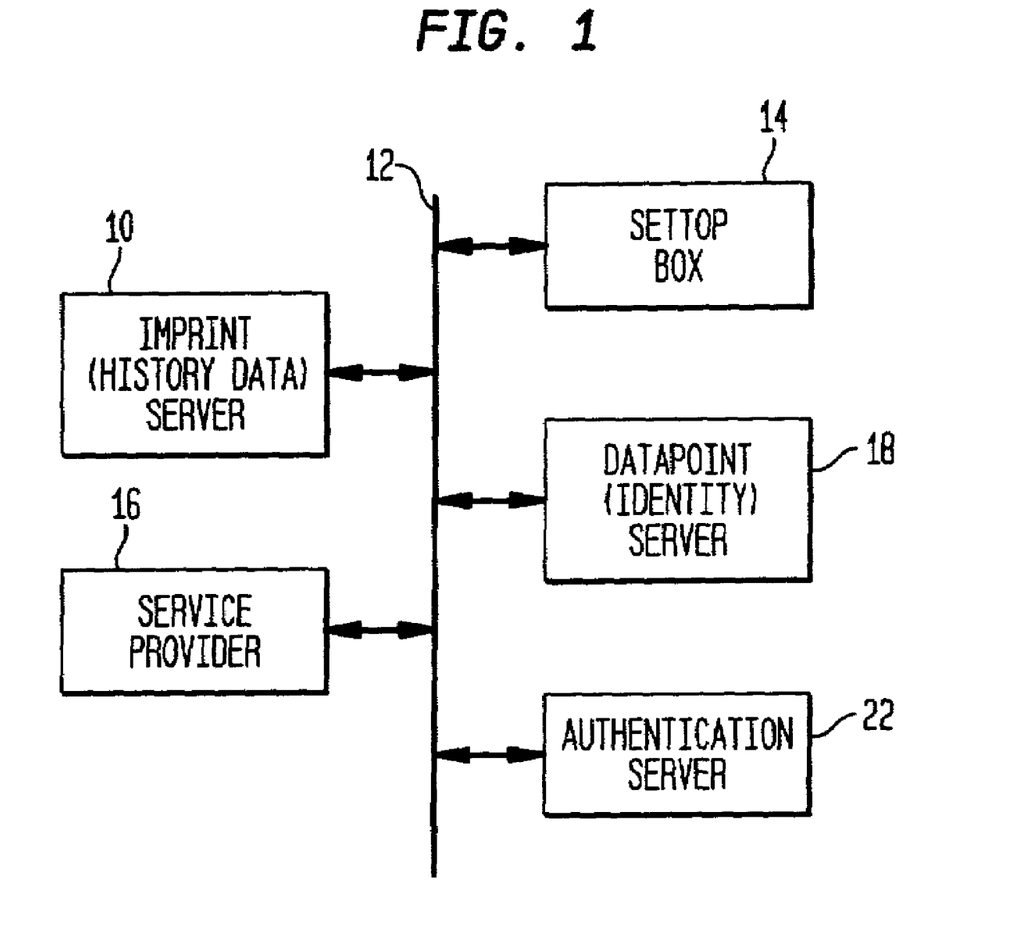
FIG. 1 is a block diagram of a system for tracking user behavior embodying the present invention.

A system for anonymously tracking TV and Internet usage is shown in the system architecture of FIG. 1. For the case where an arbitrary anonymous identifier (AAI) is used, the system consists of an Imprint (history data) server 10, at least one settop box 14, a service provider 16 and a Datapoint (identity) server 18. In order to use a private anonymous identifier (PAI), an authentication server 22 is added to the system architecture.

Imprint server 10 is a centralized data repository containing the history data for all viewers. Viewer history data is stored in the Imprint server as a set of viewer actions. The identity of the viewer is not stored; instead, each set of viewer actions is associated with a unique identifying number. A data analysis tool (not shown) is provided to analyze the raw viewer history data and produce useful results.

The service provider 16, is typically a CATV operator headend facility. The settop box 14 is located at the viewer's location. The Internet 12 provides a common communication medium that links the Datapoint server 18 and the authentication server 22 with other elements of the system.

The object of the system is to create an anonymous history of the viewer's actions (taken at settop box 14) and stored on the Imprint server 10, thereby protecting the privacy of the user while collecting useful data.

Arbitrary Anonymous Identifier (AAI)

In operation, service provider 16 assigns an arbitrary anonymous identifier (i.e. a random number) to correspond to each settop box 14. The service provider 16 stores the correspondence between the assigned arbitrary anonymous identifiers and valid subscribers (viewers).

Each settop box 14 stores its assigned arbitrary anonymous identifier in memory. Settop box 14 also accumulates viewer actions in memory. Periodically, settop box 14 forwards its arbitrary anonymous identifier and viewer actions to the Imprint server 10. The Imprint server 10 thus accumulates an anonymous history of viewer actions identified with each arbitrary anonymous identifier.

The service provider 16 is the entity that assigns a given arbitrary anonymous identifier to a given subscriber. The service provider 16 stores the arbitrary anonymous identifier in the Datapoint server 18 as part of each viewer's identity. The Imprint server 10 validates a given arbitrary anonymous identifier by communication with the Datapoint server 18.

In particular, the Imprint server 10 queries the Datapoint server 18 as to whether a given arbitrary anonymous identifier represents a valid subscriber. The Datapoint server 18 responds with a return message to the Imprint server 10 as to whether the given arbitrary anonymous identifier is valid or not valid. If valid, Imprint server 10 will store the valid arbitrary anonymous identifier and corresponding viewer actions in memory.

In such manner, the Imprint server 10 accumulates a history of viewer actions. Thereafter, the service provider 16 or third parties may use the history of viewer actions for various purposes. For example, a third party or service provider 16 may inquire how many viewers watched a given show, or a given commercial. However, Imprint server 10 contains no data identifying individual viewers, thereby guaranteeing viewer privacy. The use of an arbitrary anonymous identifier guarantees that the identity of the viewer is kept secret from third parties. The service provider however knows the identity of viewers by the correspondence between arbitrary anonymous identifier and viewers. By maintaining the list of viewers and arbitrary anonymous identifiers in secret, the privacy of the viewer is protected.

Changing Identity

As a further privacy aspect of the present invention, the viewer has the option of acquiring a new arbitrary anonymous identifier independent of the former arbitrary anonymous identifier. The former arbitrary anonymous identifier is written over (erased) by the new arbitrary anonymous identifier. In such manner, the subscriber's viewing history going forward is de-linked from the subscriber's viewing history in the past.

In operation, the subscriber at settop box 14 provides an indication that a new identity is desired. The service provider 16 responds by selecting a new arbitrary anonymous identifier for the viewer at settop box 14. Thereafter, viewer actions are reported to the Imprint server 10 using the new arbitrary anonymous identifier. Although the viewer history file may be retained for various purposes, the previous arbitrary anonymous identifier is discarded. No further viewer actions are reported to the Imprint server 10 using the previous arbitrary anonymous identifier.

Private Anonymous Identifier

A system in which the correspondence between the identity of the viewer is kept secret from the service provider 16 is achieved by the use of a secret password entered by the viewer in order to generate a private anonymous identifier. An authentication server 22 is provided in order to validate a given private anonymous identifier.

Figure 4:
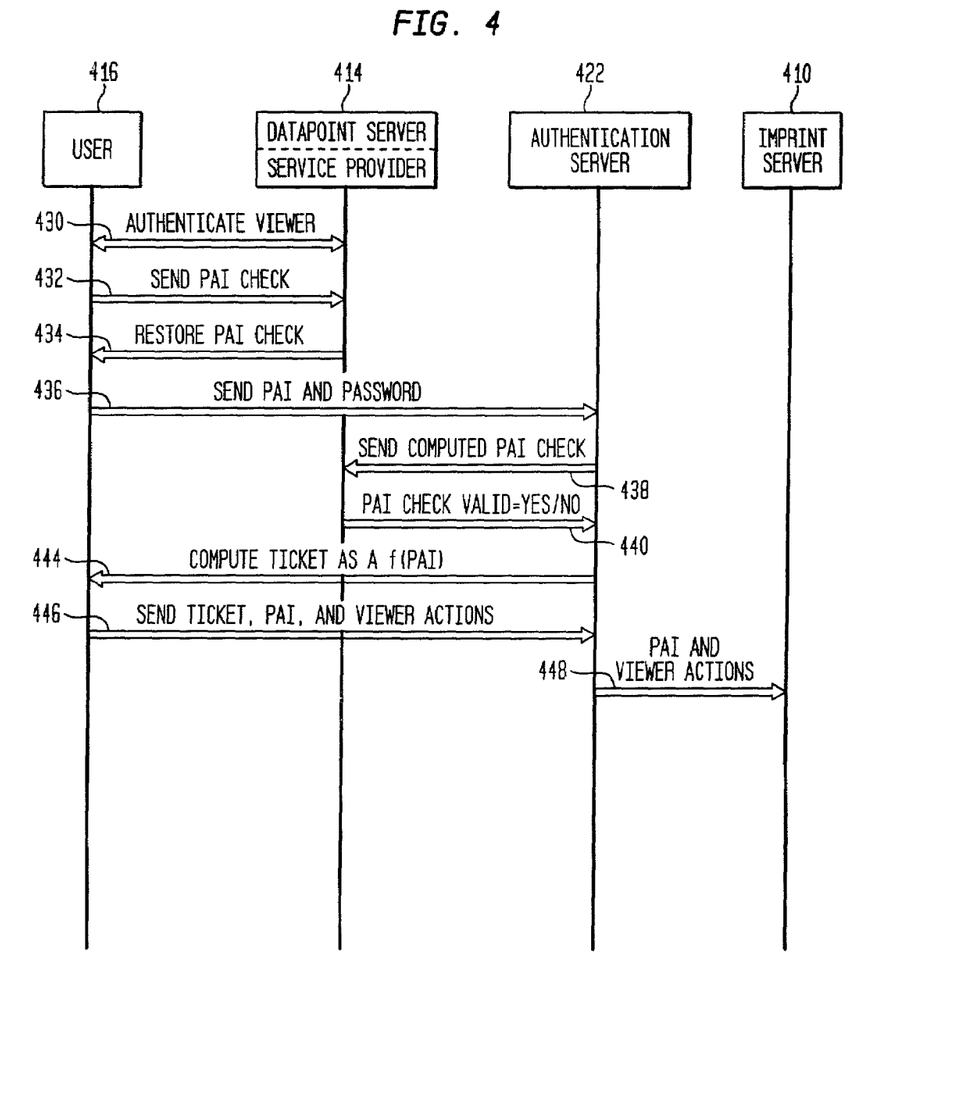
FIG. 4 is a signal flow chart diagram illustrating the process for verifying that a given private anonymous identifier is valid.

FIG. 4 is a signal flow diagram illustrating the messages exchanged between the Imprint server 10, the settop box 14, the Datapoint server 18 and service provider 16, and the authentication server 22. As used herein and in the accompanying drawings, the terms "private anonymous identifier", "private anonymous ID" and "PAI" are equivalent. Similarly, the terms "private anonymous identifier check", "private anonymous ID check" and "PAI check" are equivalent.

First, the service provider/Datapoint server 414 determines that the viewer 416 is a valid user. To authenticate the viewer 416, to the service provider/Datapoint server 414, the user 416 and the service provider/Datapoint server 414 complete a protocol exchange 430. Viewer authentication 430 is a well-known process (such as requiring entry of a user ID and password) in which the user 416 fully identifies himself to the service provider/Datapoint server 414, and the service provider/Datapoint server 414 fully verifies that the user 416 is a valid user. In a sense, the authentication process 430 is the antithesis of privacy, since the identity of the user 416 is being confirmed.

After the initial (first time) viewer authentication 430, the user 416 computes a private anonymous identifier and a private anonymous identifier check. The user 416 sends (transmits) the computed private anonymous identifier check 432 to the service provider/Datapoint server 414 for storage in the Datapoint server. Thereafter (upon subsequent viewer authentication 430), in order to restore the user's settop box 416 (such as during a power up cycle), the service provider/Datapoint server 414 restores the private anonymous identifier check 434 from the service provider/ Datapoint server 414 to the user's settop box 416.

As indicated above, the authentication server 422 is provided for the purpose of determining that a given private anonymous identifier is valid. The user 416 trusts the authentication server 422 not to share the user's secret password with the service provider or Datapoint server. The data exchange between the user 416 and the authentication server 422 is typically encrypted under a secure protocol, such as Secure Socket Layer (SSL).

The user 416 forwards the private anonymous identifier and secret password to the authentication server 422. The authentication server 422 computes the private anonymous identifier check in the same manner as would be done in the settop box 416. The authentication server 422 sends the computed private anonymous identifier check 438 to the service provider/Datapoint server 414. The query 438 to the service provider/Datapoint server 414 is whether the computed private anonymous identifier check is valid. The service provider/Datapoint 414 responds to the authentication server 422 with whether or not the private anonymous identifier check is valid or not valid 440. The authentication server 422 trusts the service provider/Datapoint server 414 to correctly answer a validation query.

Finally, based on the validity of the received private anonymous identifier, the authentication server 422 computes a validation ticket as a function of the received private anonymous identifier. A known protocol, the Kerberos protocol, may be used to compute the validation ticket. The settop box 416 stores the computed validation ticket. The validation ticket, which includes an expiration date, is a statement indicating that authentication of the received private anonymous identifier has occurred. In the future, by receiving the validation ticket with the private anonymous identifier from the settop box, the authentication server need not re-authenticate the received private anonymous identifier.

To report viewer actions to the Imprint server 410, the settop box 416 first communicates with the authentication server 422. In particular, the settop box 416 forwards its previously stored validation ticket, private anonymous identifier and accumulated viewer actions 446 to the authentication server 422. The authentication server 422 checks the validation ticket in order to validate the private anonymous identifier. If the private anonymous identifier is determined to be valid by the authentication server 422 as a result of checking the received validation ticket, then the received private anonymous identifier and viewer actions are forwarded 448 to the Imprint server 410.

The present system may be operated without the use of a validation ticket. Without a validation ticket, the user 416 would transmit its private anonymous identifier and password 436 to the authentication server 422 each time it reported viewer actions. The authentication server would then send a computed private anonymous identifier check 438 to the service provider/Datapoint server 414. The query: "Is this private anonymous identifier check valid?" would be repeated 438 each time the user 416 reported viewer actions. The service provider/Datapoint server 414 would respond as to whether the reported private anonymous identifier check was valid or not valid 440. The verification of a valid private anonymous identifier check would be carried out each time the user 416 reported viewer actions.

In order to save time and communication resources, the authentication server 422 computes a validation ticket 444 for storage in the settop box 416. Once having a validation ticket, the settop box 416 attaches the validation ticket to reported viewer actions 446 (along with the private anonymous identifier). Thereafter, the validation ticket and private anonymous identifier is attached to all future reported viewer actions 446. Each time, if the authentication server 422 determines that the received validation ticket is in fact valid, then the received private anonymous identifier and viewer actions are forwarded 448 to the Imprint server 410 in reporting viewer actions.

Figure 3:
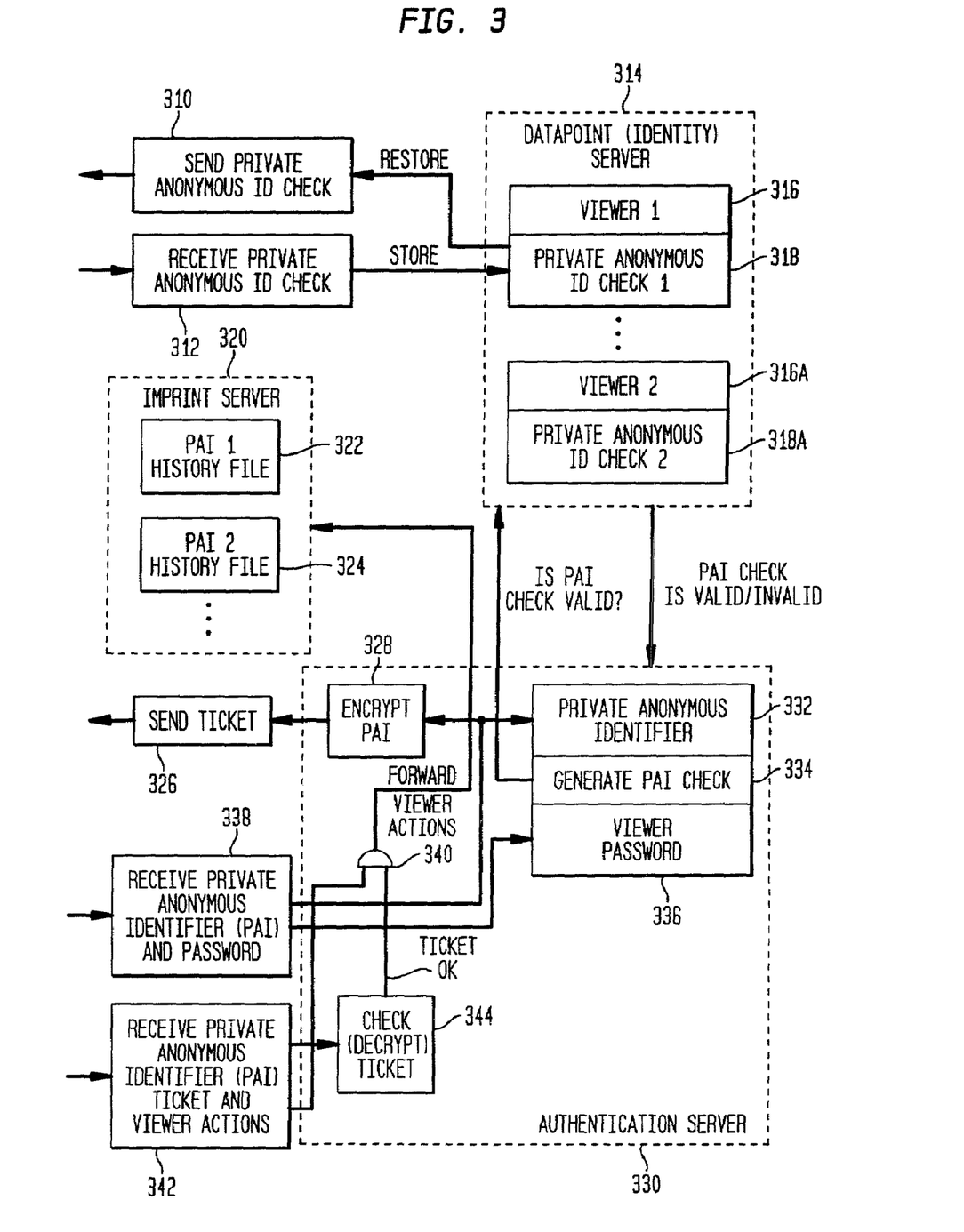
FIG. 3 is a block diagram partial in flow chart form, illustrating the method and apparatus for using a private anonymous identifier in tracking user behavior in accordance with the present invention.

Further details of the present system using a private anonymous identifier are shown in FIG. 3. The Datapoint (identity) server 314 includes memory 316, 316A, 318, 318A for storing viewer records including viewer identities viewer 1, 316, and viewer 2, 316A, corresponding to respective private anonymous identifier check 1, 316, and private anonymous identifier check 2, 316A. The Imprint server 320 includes memory 322, 324 for storing anonymous viewer history files. In particular, a first history file 322 associates viewer actions with a first private anonymous identifier. A second history file 324 associates viewer actions with a second private anonymous identifier. The Imprint server 320 receives validated private anonymous identifiers and corresponding viewer data from the authentication server 330. The Imprint server 320 trusts the authentication server 330.

The authentication server 330 includes memory buffers 332, 334 and 336. In particular, a received private anonymous identifier 332 is held in temporary storage buffer 332 and a received viewer password is held in temporary storage buffer 336. The authentication server 330 further includes an encryption function 328, which generates a validation ticket as a function of the private anonymous identifier. The authentication server 330 further includes a decryption function 344, which checks whether a received validation ticket corresponds to a received private anonymous identifier.

Figure 2A:
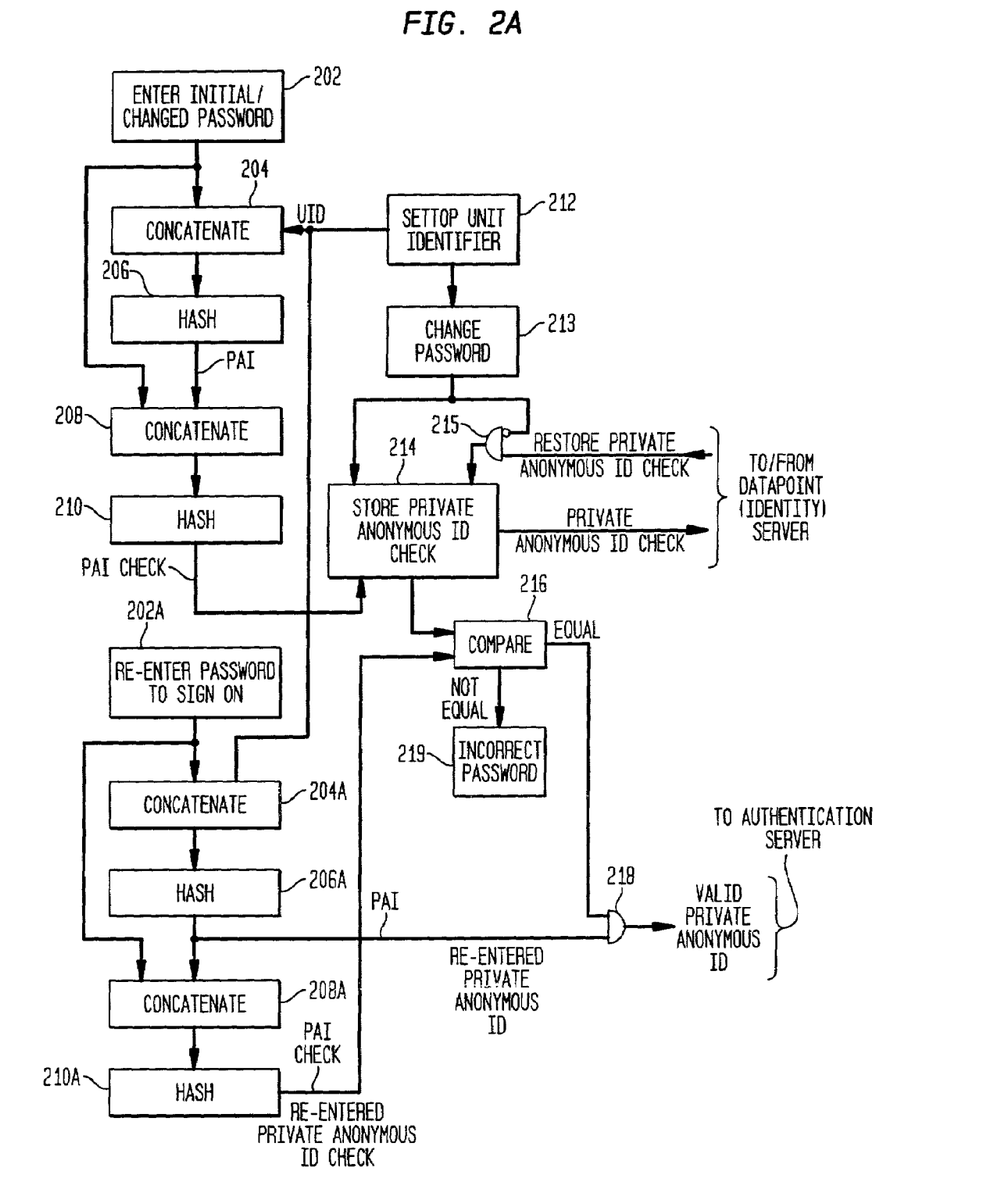
FIGS. 2A and 2B are block diagrams partially in flow chart form, illustrating the method and apparatus for generating a private anonymous identifier in a settop box in accordance with the present invention.

The signals on left side of FIG. 3 represents data sent to, and received from, the settop box (shown FIG. 2A). In operation, when a new private anonymous identifier is created in the settop box, a private anonymous identifier check is received 312 from the settop box and stored 318 in the Datapoint server 314. Receiving the private anonymous identifier check 312 in FIG. 3 is equivalent to receiving the private anonymous identifier check 432 in FIG. 4. When necessary, such as upon settop box power up cycle, a previously stored 318 private anonymous identifier check is sent 310 to the settop box to restore the memory of the private anonymous identifier check in the settop box. Sending (restoring) the private anonymous identifier check 310 to the settop box in FIG. 3 is equivalent to storing (sending) the private anonymous identifier check 434 in FIG. 4.

To enable the authentication server 330 to determine that a given private anonymous identifier is valid, a viewer password and a private anonymous identifier are received 338 from the settop box. The received private anonymous identifier is stored in a memory buffer 332. Similarly, the received viewer password is stored in a buffer 336. Having stored the private anonymous identifier 332 and the viewer password 336, the authentication server 330 independently generates the private anonymous identifier check 334. The generated private anonymous identifier check 334 is sent to the Datapoint server 314 with the query: "Is this private anonymous identifier check valid?" If the Datapoint server 314 indicates that the private anonymous identifier check is valid, then a validation ticket as a function of the private anonymous identifier is generated in encryption circuit 328. The validation ticket is sent 326 to the settop box.

After a validation ticket is computed 328 and sent 326 to the viewer, the settop box reports viewer actions, a corresponding private anonymous identifier and companion validation ticket 342 to the authentication server 330. The authentication server 330 checks the received validation ticket in decryptor 344 and determines if the received validation ticket corresponds to the sent private anonymous identifier. If received validation ticket is valid, then a "ticket ok" signal indication from decryptor 344 enables AND gate 340 to transmit the received private anonymous identifier and viewer actions to the Imprint server 320. The Imprint server 320 stores the private anonymous identifier and corresponding viewer history data 322, 324. The authentication server 330 acts as a gateway between the user and the Imprint server 320.

Critical Data

The authentication server 330 contains no permanent data storage. Instead, the authentication server 330 has only temporary memory buffers, 332, 334, 336 used for generating a private anonymous identifier check 334. There is also some temporary memory used in generating a validation ticket 328 and checking a received validation ticket 344. The authentication server 330, generally lacking mass data storage, does not store passwords, or private anonymous identifiers, or private anonymous identifier checks. After using critical data such as a password or a private anonymous identifier to validate a private anonymous identifier or check a validation ticket, the authentication server 330 discards such critical data and does not store it permanently.

The Datapoint server 314 contains viewer identification records 316, 316A correlated to corresponding private anonymous identifier checks, 318, 318A. The Datapoint server 314 does not store the private anonymous identifier itself. Passwords are stored nowhere in the system, not even in the settop box. Furthermore, no system node stores the correspondence between a given private anonymous identifier 322, 324 history file and the identity of the viewer 316, 316A. The Imprint server 320 stores the history of viewer actions identified only by the private anonymous identifiers, which are private, thereby preserving the user's privacy.

Settop Box

Figure 2B:
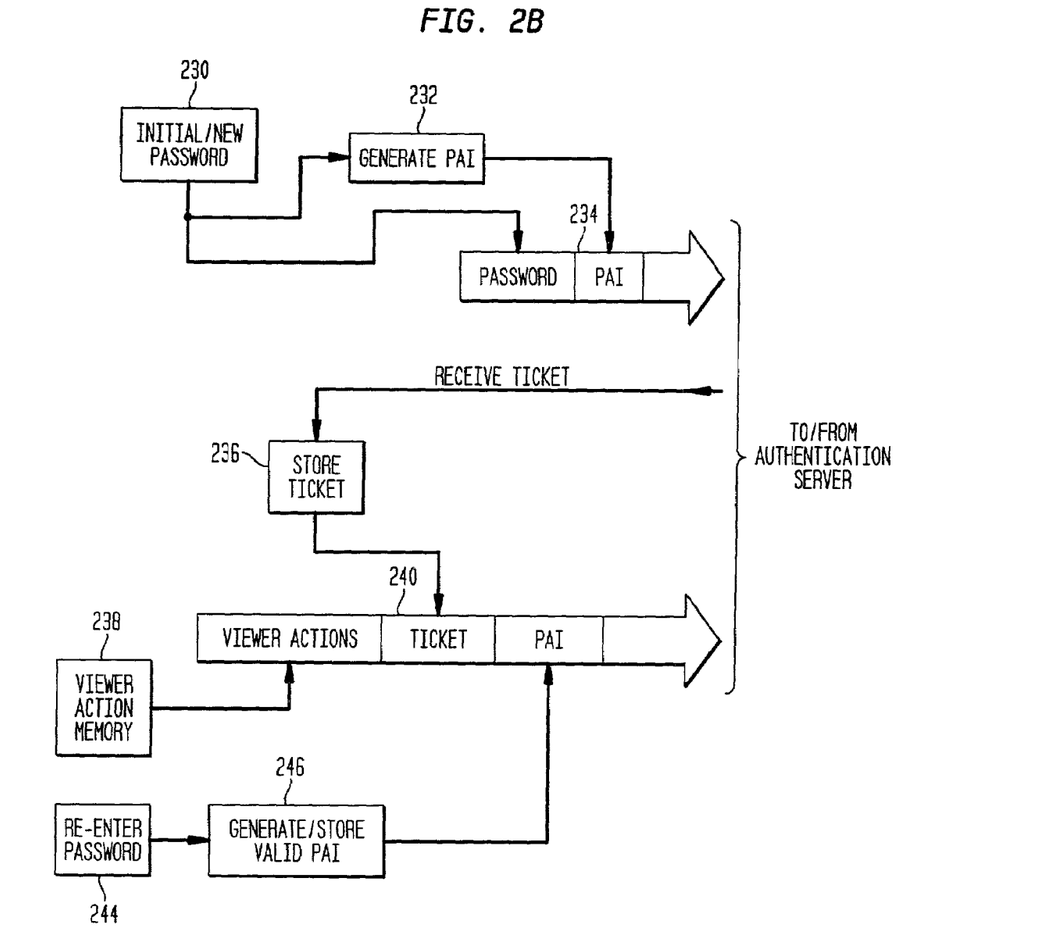

A block diagram of a settop box is shown in FIGS. 2A and 2B. The process for forming a private anonymous identifier and private anonymous identifier check is illustrated in the upper left of FIG. 2A. In particular, a one-way hash function 206, 210 and registers 204, 208 to concatenate two numbers are provided. The settop box further includes registers 212, 214 for storing the settop unit identifier (UID) 212, the private anonymous ID check 214 and a comparator 216 for determining whether two inputs are equal or not equal.

Basic Sequence for Generating the PAI and the PAI Check

Privacy is enhanced because the settop box has no persistent storage of its password or corresponding private anonymous identifier. The settop regenerates its unique private anonymous identifier each time it goes through a power cycle or before it uploads viewer actions to the Imprint server. Upon initial registration or a power up cycle, a password is obtained from the user as the seed to generate the private anonymous identifier.

Initial generation (registration) of a private anonymous identifier (PAI) 202, 204, 206, 208, 210

1) Obtain a password (PW) from the user 202 during the registration process. The password is not saved anywhere in any format.
2) Compute 212, 204, 206 the PAI=h(PW||UID), where the UID is an identifier selected by the service provider corresponding to either the user or the user's hardware, and where h( ) is a secure one-way function such as MD5 or SHA1 and "||" is the string concatenation of PW and UID. The PAI is the unique identifier in the Imprint Server associated with the user's history data.
3) Compute 208, 210 the PAI check=h(PW||PAI). The PAI check is stored in the Datapoint server for download to the user on the next power cycle. For efficiency, the PAI check is cached 214 in the settop box between power cycles.

Subsequent generation of the private anonymous identifier 202A, 204A, 206A, 208A, 210A 4) Each time the box is power cycled (or to change the viewer's identity), the password is obtained from the user again 202A and jog the PAI check is fetched 213, 215, 214 from the Datapoint sever. The user entered password is verified by regenerating 204A, 206A, 208A, 210A the PAI check:

$$PAI=h(PW\|UID)$$

$$PAI\ check=h(PW\|PAI)$$

Where the PAI check on left side of the above equation is computed in the settop and compared 216 to the PAI check fetched 215, 214 from the Datapoint server.

In particular, upon entering an initial (or changed) user password 202, the user password 202 is concatenated 204 with the UID 212 and the result processed in a hash function 206 to produce a private anonymous identifier. To produce a private anonymous identifier check, the private anonymous identifier is further concatenated 208 with the user password 202 and processed in a second hash function 210. The resulting private anonymous identifier check at the output of hash function 210 is stored in a register 214.

If the password entered is an initial or changed password 202 so that the change password flag 213 is set, then the private anonymous identifier check at the output of hash function 210 is stored in register 214. The private anonymous ID check in register 214 is sent to the service provider where it is stored as part of the viewer's identity in the Datapoint server.

Each time a user selects a new password, a new different private anonymous identifier is created for a given user. For a given a private anonymous identifier, there is substantially no mathematical algorithm for determining the specific user corresponding to the given private anonymous identifier. The only mapping between the identity of the user and the private anonymous identifier exists in the equipment on the viewer's premises (i.e., in the settop box).

When the viewer subsequently logs onto the system, such as during a power up cycle, the user must re-enter his remembered password. A re-entered password 202A, is processed in the same manner as an initial password is processed as illustrated as duplicate functions 204A, 206A, 208A and 210A for clarity. The process for generating a private anonymous identifier check is repeated in order to generate a reentered private anonymous identifier and a reentered private anonymous identifier check. Since the re-entered password is not an initial or changed password, the change password flag 213 is reset, and the previously stored private anonymous ID check from the Datapoint server is re-stored in register 214 via AND gate 215.

The reentered private anonymous identifier check is compared 216 to the stored private anonymous identifier check 214. If the reentered private anonymous identifier check is not equal to the stored private anonymous identifier check 214 then an error message 219 "incorrect password" is displayed to the user.

The user is then given an opportunity to re-enter 202A the correct password to sign on. If the output of comparator 216 indicates that the reentered private anonymous identifier check and the stored private anonymous identifier check 214 are equal, then the reentry of the secret password is correct. The reentered private anonymous ID is then forwarded to the authentication server via AND gate 218 in order to obtain a validation ticket. In such manner, the present system provides the ability to verify that a currently entered password is the same as the previously entered password even though the viewer's password is not stored anywhere on the settop, the service provider, Datapoint server or authentication server.

FIG. 2B illustrates the method and apparatus in a settop box for initial registration and reporting viewer actions in accordance with the present invention. Upon initial registration or selection of a new password 230 a private anonymous identifier is generated 232. A message 234 consisting of the private anonymous identifier and the password is assembled and forwarded to the authentication server. Message 234 in FIG. 2B is equivalent to message 436 in FIG. 4. In response, the authentication server computes a validation ticket and transmits it to the settop box for storage 236. The received validation ticket 236 in FIG. 2B is contained in the message 444 of FIG. 4.

Viewer actions are stored in a memory 238 in the settop. Also, a valid private anonymous identifier 246 is generated based on a user-entered password 244. Periodically, in order to report stored viewer actions 238, the settop box assembles a message 240 consisting of a private anonymous identifier, a stored validation ticket 236 and viewer actions 238. The authentication server uses the validation ticket to verify the validity of the private anonymous identifier.

Password Entry

The initial generation of the PAI check occurs at the initial registration time and each time the viewer opts to change the private anonymous identity. If the generated private anonymous identifier at the output of AND gate 218 (FIG. 2A) is stored locally in a register 246 (FIG. 2B) in the settop box, then the user does not need to re-enter the password each time that the viewer action memory 238 (FIG. 2B) is forwarded to the authentication server. Otherwise, the user password is needed each time the viewer action memory 238 is forwarded to the authentication server. Comparator 216 (FIG. 2A) assures that the re-enter password is the same as the originally entered password.

The user needs to input the password each time the settop box is power cycled. In practice, it is not frequent for a user to power cycle the settop box. Even when turned "off", the settop is plugged into an AC power source that continues to power internal functions. Therefore, it is not burdensome to obtain a password from a user on the occasional power cycles.

Uniqueness of the Private Anonymous Identifier (PAI)

Strictly speaking, the private anonymous identifier generated by a hash function is not absolutely unique. However, absolute uniqueness is not necessary since the chance of two different users having the same PAI is very small. Theoretically, the probability two PAIs being equal is $\frac{1}{2}^{128}$ if MD5 is used as the hash function, and $\frac{1}{2}^{160}$ if SHA-1 is used as the hash function. Thus, with respect to the generated private anonymous identifier, "unique" means "substantially unique". The consequence of two users having the same private anonymous identifier is that the histories of the two viewers are merged in a manner similar to the way multiple viewer histories are merged when using a "blocked level" of privacy.

Reverse Mapping the Private Anonymous ID to the User

The complexity to figure out the mapping between the UID and the private anonymous identifier is equivalent to the complexity to figure out the password if provided with the hash of the password. Since the hash is a secure one-way function, a password guess attack is the only way to achieve reverse mapping of the private anonymous identifier back to the UID. Forcing the client to choose a good (hard to guess) password would enhance the viewer's level of privacy.

Reverse Mapping the PAI Check to the PAI

Similarly, the complexity to figure out the mapping between the private anonymous identifier and the private anonymous identifier check is equivalent to the complexity to figure out the private anonymous identifier if provided with the hash of the private anonymous identifier. Since the hash is a secure one-way function, a private anonymous identifier guess attack is the only way to achieve reverse mapping of the private anonymous identifier check back to the private anonymous identifier. Again, a good to hard to guess password enhances the viewer's level of privacy.

What is claimed is:

1. In a settop box having a memory for storing a plurality of user actions at said settop box, a method for anonymously reporting said user actions from said settop box, said method comprising:
   receiving a user selected password by said settop box, wherein said user selected password is never permanently recorded or stored;
   generating a private anonymous identifier based on said user selected password and said unit identifier associated with said settop box by at least:
      concatenating said user selected password and said unit identifier; and
      hashing said concatenated user selected password and said unit identifier to form said private anonymous identifier; and
   transmitting said private anonymous identifier and said stored user actions from said settop box.

2. A method in accordance with claim 1, wherein said unit identifier is associated with said user.

3. A method in accordance with claim 1, said method further comprising:
   concatenating said user selected password and said private anonymous identifier;
   hashing said concatenated user selected password and said private anonymous identifier to form a private anonymous identifier check; and
   transmitting said private anonymous identifier check from said settop box.

4. In a network system including a settop box, a service provider, a user history server and an authentication server, said settop box having a memory for storing user actions, a method for anonymously reporting said user actions from said settop box, said method comprising:
   receiving a user selected password into said settop box, wherein said user selected password is never permanently recorded or stored;
   generating a private anonymous identifier based on said user selected password;
   a transmitting said user selected password and said private anonymous identifier based on said user selected password to said authentication server;
   computing a private anonymous identifier check at said authentication server based on said user selected password and said private anonymous identifier received from said settop box at said authentication server to form a computed private anonymous identifier check;
   transmitting said computed private anonymous identifier check to said service provider; and
   receiving an indication from said service provider at said authentication server as to whether said computed private anonymous identifier check received from said authentication server is a valid private anonymous identifier check;
   computing a validation ticket based on said private anonymous identifier at said authentication server if said indication received from said service provider indicates that said private anonymous identifier check is valid; and
   transmitting said validation ticket from said authentication server to said settop box.

5. In a network system in accordance with claim 4, said method further comprising:
   transmitting said validation ticket, said private anonymous identifier and said stored user actions from said settop box to said authentication server.

6. In a network system in accordance with claim 5, said method further comprising:
   receiving said validation ticket, said private anonymous identifier and said stored user actions from said settop box at said authentication server;
   determining whether said validation ticket received from said settop box is valid; and
   transmitting said user actions to said user history server, if said validation ticket is determined to be valid.

7. In a network system in accordance with claim 4, said method further comprising:
   transmitting said user actions from said authentication server to said user history server, if said indication received from said service provider indicates that said computed private anonymous identifier check is a valid private anonymous identifier check.

8. In a network system in accordance with claim 4, said method further comprising:
   transmitting said private anonymous identifier and said stored user actions from said settop box to said authentication server.

9. In a network system in accordance with claim 8, said method further comprising:
   transmitting said private anonymous identifier and said stored user actions from said authentication server to said user history server.

10. In a settop box in a network having a service provider, a method for verifying that a re-entered password entered by a user is the same password as a prior password previously entered by said user into said settop box, said method comprising:
    computing a first private anonymous identifier based on said password entered by said user; wherein said user selected password is never permanently recorded or stored;
    computing a first private anonymous identifier check based on said first private anonymous identifier;
    storing said first private anonymous identifier check in said settop box;
    computing a second private anonymous identifier based on said re-entered password entered by said user;
    computing a second private anonymous identifier check based on said second private anonymous identifier;
    comparing said second private anonymous identifier check and said first private anonymous identifier check stored in said settop box and
    transmitting said first private anonymous identifier check from said settop box to said service provider if said second private anonymous identifier check matches said first private anonymous identifier check.

11. In a settop box in accordance with claim 10, said method further comprising:
    generating an error message indicating an incorrect password to said user if said second private anonymous identifier check and said first private anonymous identifier check stored in said settop box are not equal.

12. In a settop box in accordance with claim 10, said method further comprising:
    transmitting said first private anonymous identifier check from said service provider to said settop box.

* * * * *